United States Patent
Cooper

(10) Patent No.: US 6,174,061 B1
(45) Date of Patent: *Jan. 16, 2001

(54) COMPACT ELECTRO-OPTICAL SENSOR ASSEMBLY HAVING SINGLE APERTURE FOR MULTIPLE DETECTORS

(75) Inventor: Erwin E. Cooper, Frisco, TX (US)

(73) Assignee: Raytheon Company, Lexington, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/052,911

(22) Filed: Mar. 31, 1998

(51) Int. Cl.$^7$ .............................. G02B 5/08; G02B 17/00
(52) U.S. Cl. ........................................... 359/857; 359/366
(58) Field of Search .................................. 359/355, 357, 359/353, 366, 364, 362, 351, 354; 356/856, 857, 858, 859, 860, 861, 364, 366

(56) References Cited

U.S. PATENT DOCUMENTS

| | | |
|---|---|---|
| 4,215,273 | 7/1980 | Stokes et al. . |
| 4,504,110 * | 3/1985 | Pittenger ............................. 359/357 |
| 4,621,888 * | 11/1986 | Crossland et al. ................... 359/357 |
| 4,751,571 | 6/1988 | Lillquist . |
| 4,871,219 | 10/1989 | Cooper ................................. 350/1.4 |
| 4,999,005 | 3/1991 | Cooper ................................. 350/1.4 |
| 5,276,321 * | 1/1994 | Chang et al. ........................ 250/226 |
| 5,400,169 | 3/1995 | Eden . |
| 5,777,768 * | 7/1998 | Korevaar ............................. 359/172 |

\* cited by examiner

*Primary Examiner*—Cassandra Spyrou
*Assistant Examiner*—Jared Treas
(74) *Attorney, Agent, or Firm*—Baker Botts, L.L.P.

(57) ABSTRACT

A sensor assembly (10) includes first and second focusing mirrors (21, 22) which direct converging radiation to a tilted beam splitter (31) through an opening (23) provided in the first mirror. The beam splitter passes selected infrared radiation, which then passes through a lens system (33, 34, 41) to an infrared detector (16). The beam splitter reflects other radiation, which then passes through a different lens system (46, 56, 58, 61, 62, 67, 68, 69) to a second beam splitter (73). The second beam splitter passes laser light, which travels through a lens (77) to a laser light detector (18). The second beam splitter reflects near-infrared radiation, so that it travels to a further detector (17).

33 Claims, 8 Drawing Sheets

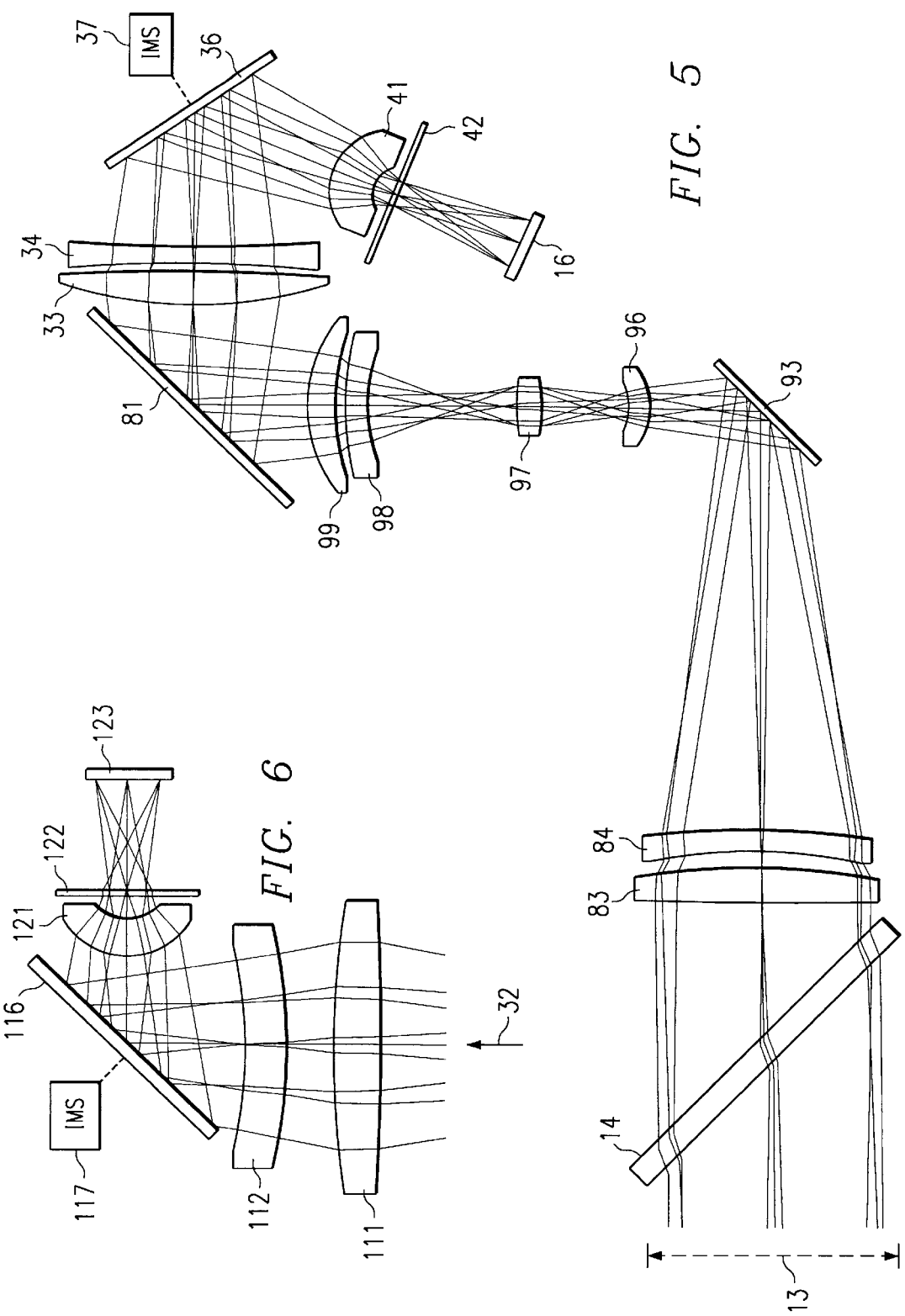

COMPACT ELECTRO-OPTICAL SENSOR ASSEMBLY HAVING SINGLE APERTURE FOR MULTIPLE DETECTORS

TECHNICAL FIELD OF THE INVENTION

This invention relates in general to an electro-optical sensor assembly and, more particularly, to an electro-optical sensor assembly having multiple detectors using a common aperture, the detectors being responsive to radiation at respective different wavelengths.

BACKGROUND OF THE INVENTION

Electro-optical sensor assemblies use optical components to route and focus received radiation onto an electro-optical detector. The detector may be responsive to longwave infrared radiation (approximately 8 to 10 micron wavelengths), midwave infrared radiation (approximately 3 to 5 micron wavelengths), near-infrared radiation (approximately 0.7 to 0.9 micron wavelengths), laser light (such as 1.06 to 1.54 micron wavelengths), or radiation having other wavelengths. Frequently, a sensor assembly will be a multi-spectral device having two or more detectors which are responsive to radiation at respective different wavelengths, and which require separate imaging optics.

The size and weight of electro-optical sensor assemblies has always been a significant design consideration, and the problem is compounded when a sensor assembly includes multiple detectors. In an airborne application, the size of the sensor assembly dictates the size of the required gimbal, which in turn affects the overall system size and weight. Since the sensor assembly and gimbal may both be in the airstream, the size of each can affect the overall aircraft drag. In ground applications, where a head mirror is used for elevation pointing, the number of optical apertures and the size of these apertures dictate the head mirror size. In turn, the head mirror size affects the size and weight of the surrounding armor plate.

Multi-detector sensor assemblies may have other requirements that affect size, weight and/or performance. Imaging optics with long optical paths can result in optical losses, or in other words poor optical transmission. Also, two-dimensional infrared staring arrays with excellent resolution are becoming available, and where one or more of the detectors in a sensor assembly is such a staring array, optical-mechanical image motion stabilization (IMS) may be required in order to permit the overall system to output an image having the high resolution which the staring array itself is capable of producing.

One known approach for reducing the size of a multi-detector sensor assembly is to use a common aperture for two or more of the detectors. One known system uses a completely reflective afocal up front, which transmits all wavelengths. Tilted beam splitters are used after the afocal in order to separate different wavelengths for the respective detectors. A respective different refractive lens system is typically provided after the beam splitters for each detector.

In this known approach, the tilted beam splitters are located in collimated light, where aberrations are not a problems. However, the afocal itself is rather large. Moreover, multiple fields of view are difficult to achieve with a completely reflective afocal. The afocal can be totally bypassed for a second field of view, but if three fields of view are required, the optical system must transmit at all sensor wavelengths. If additional fields of view are made refractive, the materials used may not transmit some wavelengths of interest. If reflective optics are employed, large fields of view are difficult to achieve.

An all-refractive optic approach has been used in a single aperture, multi-spectral sensor assembly, one example of which is U.S. Pat. No. 4,621,888. This assembly can be used to achieve a common aperture for visible wavelengths and for infrared wavelengths up to 12 microns. However, only the front lens is common to both detectors, and the optical paths are relatively long, so that the size of the assembly is relatively large. U.S. Pat. Nos. 4,871,219 and 4,999,005 are other examples of multi-spectral systems having refractive optics which use a common aperture. In these systems, the detectors are limited to detection of just infrared radiation.

SUMMARY OF THE INVENTION

From the foregoing, it may be appreciated that a need has arisen for a sensor apparatus which has a plurality of detectors responsive to radiation at respective wavelengths, which has a compact physical size, which has a relatively low weight, and which permits use of image motion stabilization to provide high resolution from one or more of the detectors. According to the present invention, a sensor assembly is provided to address this need.

More specifically, a sensor assembly according to the invention includes a focusing mirror arrangement which is operative to receive radiation traveling along a first optical path and to focus the radiation to travel along a second optical path. A beam splitter disposed along the second optical path is operative to cause a first portion of the radiation which has a first wavelength to be directed along a third optical path, and to cause a second portion of the radiation which has a second wavelength different from the first wavelength to be directed along a fourth optical path different from the third optical path. A first detector disposed along the third optical path is operative to detect radiation at the first wavelength, and a second detector disposed along the fourth optical path is operative to detect radiation at the second wavelength. A first lens arrangement is disposed along the third optical path between the beam splitter and the first detector, and a second lens arrangement is disposed along the fourth optical path between the beam splitter and the second detector.

BRIEF DESCRIPTION OF THE DRAWINGS

A better understanding of the present invention will be realized from the detailed description which follows, taken in conjunction with the accompanying drawings, in which:

FIG. 5 is a diagrammatic sectional view similar to FIG. 4, but depicting an alternative configuration of the optical elements that provides a middle field of view for the staring array detector;

FIG. 6 is a diagrammatic sectional view of a further staring array detector and associated optical elements, which are components of an alternative embodiment of the sensor assembly of FIG. 1;

DETAILED DESCRIPTION OF THE INVENTION

Figure 1:
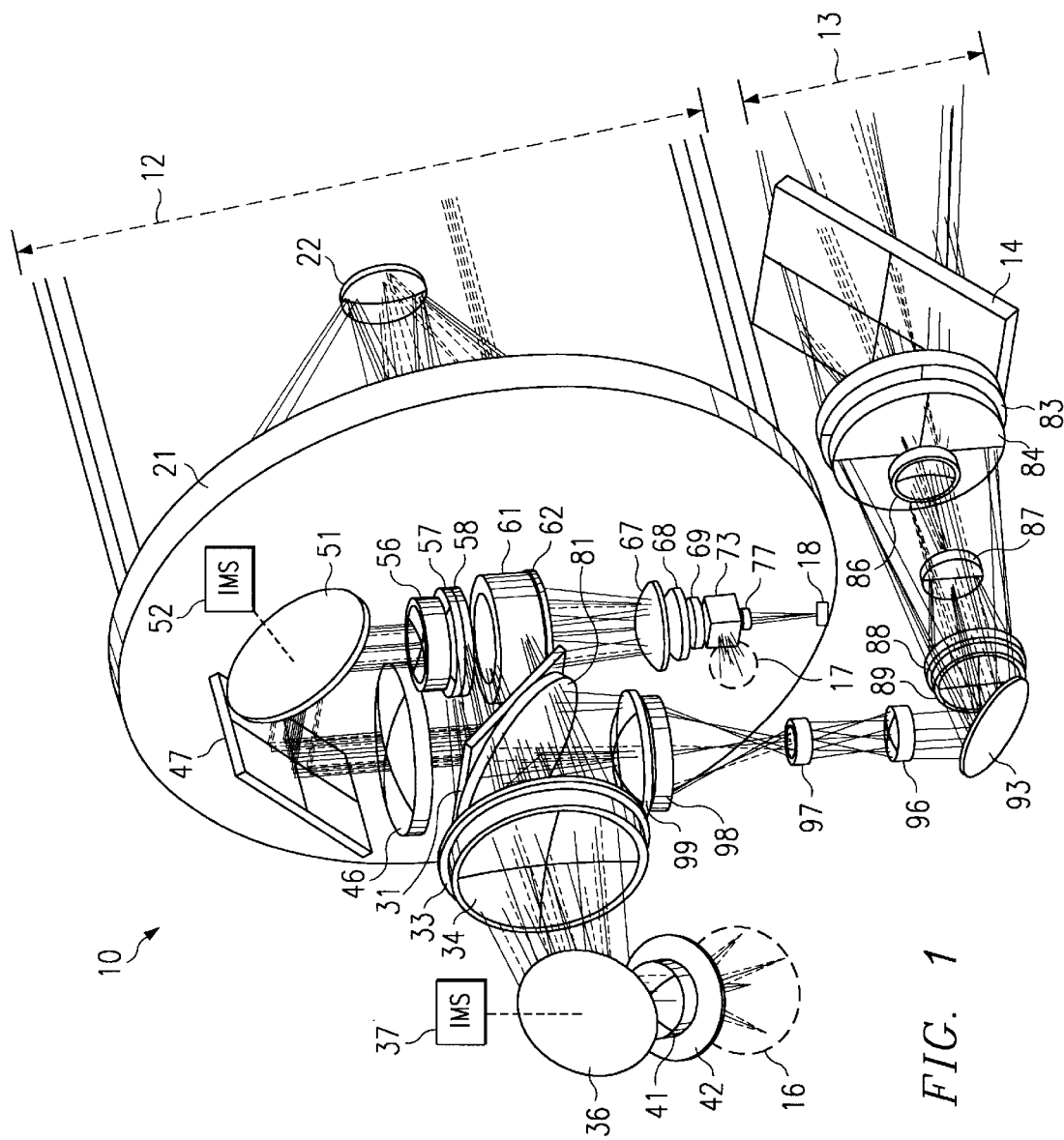
FIG. 1 is a diagrammatic perspective view of selected components of a compact sensor assembly which embodies the present invention, and which uses focusing mirrors and refractive optics.

FIG. 1 is a diagrammatic perspective view of a compact, multi-spectral, electro-optical sensor assembly 10, which embodies the present invention. The sensor assembly 10 is disposed in a housing 11 (shown diagrammatically in FIG. 2), which has at least two windows through which radiation can enter. One of the windows is shown at 14. The broken line designated at 13 diagrammatically represents the optical aperture associated with window 14, and the broken line designated at 12 diagrammatically represents the optical aperture associated with the other window. The housing 11 may have more than two windows or apertures, but only the apertures pertinent to an understanding of the present invention are illustrated and described here.

In a manner described in more detail below, radiation passing through the aperture 12 is handled by the sensor assembly 10 so that midwave infrared radiation (approximately 3 to 5 micron wavelengths) is routed to a forward looking infrared (FLIR) detector 16, near-infrared radiation (approximately 0.7 to 0.9 micron wavelengths) is routed to a television (TV) detector 17, and laser light (such as 1.06 to 1.54 micron wavelengths) is routed to a laser detector 18. The FLIR detector 16 is a two-dimensional staring array infrared detector. The TV detector 17 is a two-dimensional charge-coupled device of the type commonly used in television cameras.

Figure 2:
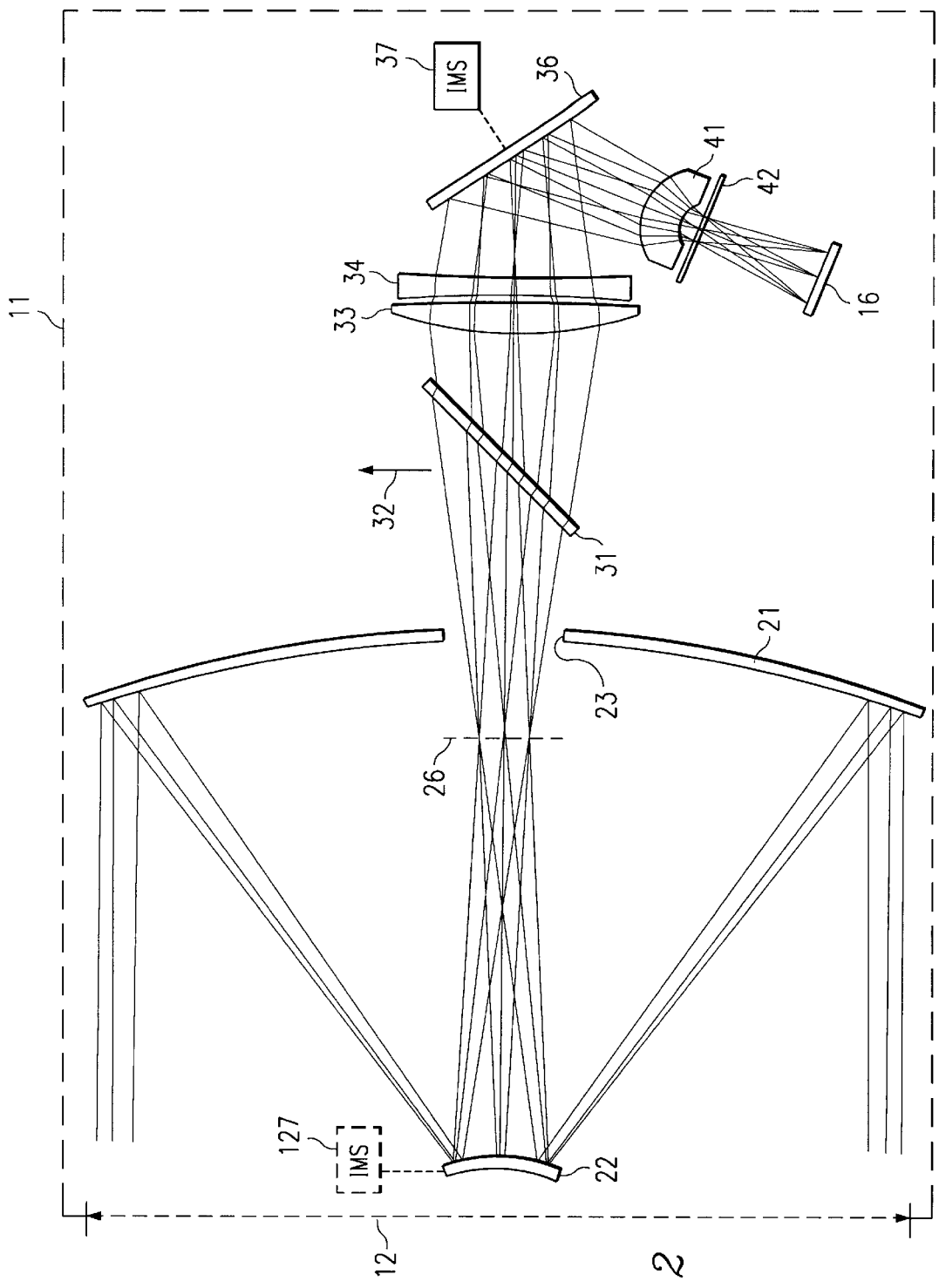
FIG. 2 is a diagrammatic sectional view of an infrared staring array detector and associated optical elements, which are all components of the sensor assembly of FIG. 1.

FIG. 2 is a diagrammatic sectional view of a portion of the structure of the sensor assembly 10, and in particular shows the optical path from the aperture 12 to the FLIR detector 16. With reference to FIGS. 1 and 2, the sensor assembly 10 includes a concave primary mirror 21 and a convex secondary mirror 22, which are focusing mirrors having a common optical axis. The primary mirror 21 is a parabolic mirror, and has a circular opening 23 provided through the center thereof. The secondary mirror 22 is a conic mirror, and faces the primary mirror 21. In the disclosed embodiment, the primary mirror 21 has a diameter of approximately 6", such that the aperture 12 also has a diameter of approximately 6". The secondary mirror 22 has a diameter substantially smaller than the diameter of the primary mirror 21.

Radiation entering the aperture 12 is focused by the primary mirror 21 onto the secondary mirror 22, and then is focused by the secondary mirror 22 back through the opening 23 in the primary mirror 21. The focusing is such that an image 26 is formed at a location between the secondary mirror 22 and the primary mirror 21, the image 26 being closer to the primary mirror 21 than the secondary mirror 22. After passing through the opening 23 in the mirror 21, the radiation reflected by the secondary mirror 22 encounters a tilted beam splitter 31. The beam splitter 31 is slightly wedge-shaped, and is located in converging radiation.

The beam splitter 31 of FIGS. 1 and 2 passes midwave infrared radiation (approximately 3 to 5 micron wavelengths), and reflects other radiation upwardly in FIGS. 1 and 2, as indicated diagrammatically by arrow 32 in FIG. 2. The reflected radiation includes longwave infrared radiation, as well as near-infrared radiation and laser light. The midwave infrared radiation which is transmitted through the beam splitter 31 then passes through a converging lens 33 and a diverging lens 34, after which it is reflected by a planar mirror 36. The mirror 36 is supported for a small amount of movement, under the control of an image motion stabilization (IMS) mechanism 37.

The IMS 37 is provided in order to permit the system to take full advantage of the high resolution capabilities of the staring array detector 16. More specifically, when the housing 11 which contains the assembly 10 is supported on a vehicle by a gimbal, the outer gimbal cannot always hold the assembly 10 sufficiently steady to allow the staring array detector 16 to accurately produce an image having the full resolution of which the detector 16 is capable. Accordingly, the IMS 37 is provided in order to dynamically fine tune the position of the mirror 36 in a manner which compensates for the motion imparted to the sensor assembly 10 by the vehicle, so that the image focused on the sensor 16 is steady and can be sensed to the full resolution capability of the detector 16.

After radiation is reflected by the mirror 36, it passes through a converging lens 41, and then passes through a window 42 which is made of infrared-transparent material, such as silicon or germanium. An image from the radiation is focused on the surface of the detector 16, which outputs an electrical signal representative of the image.

Figure 3:
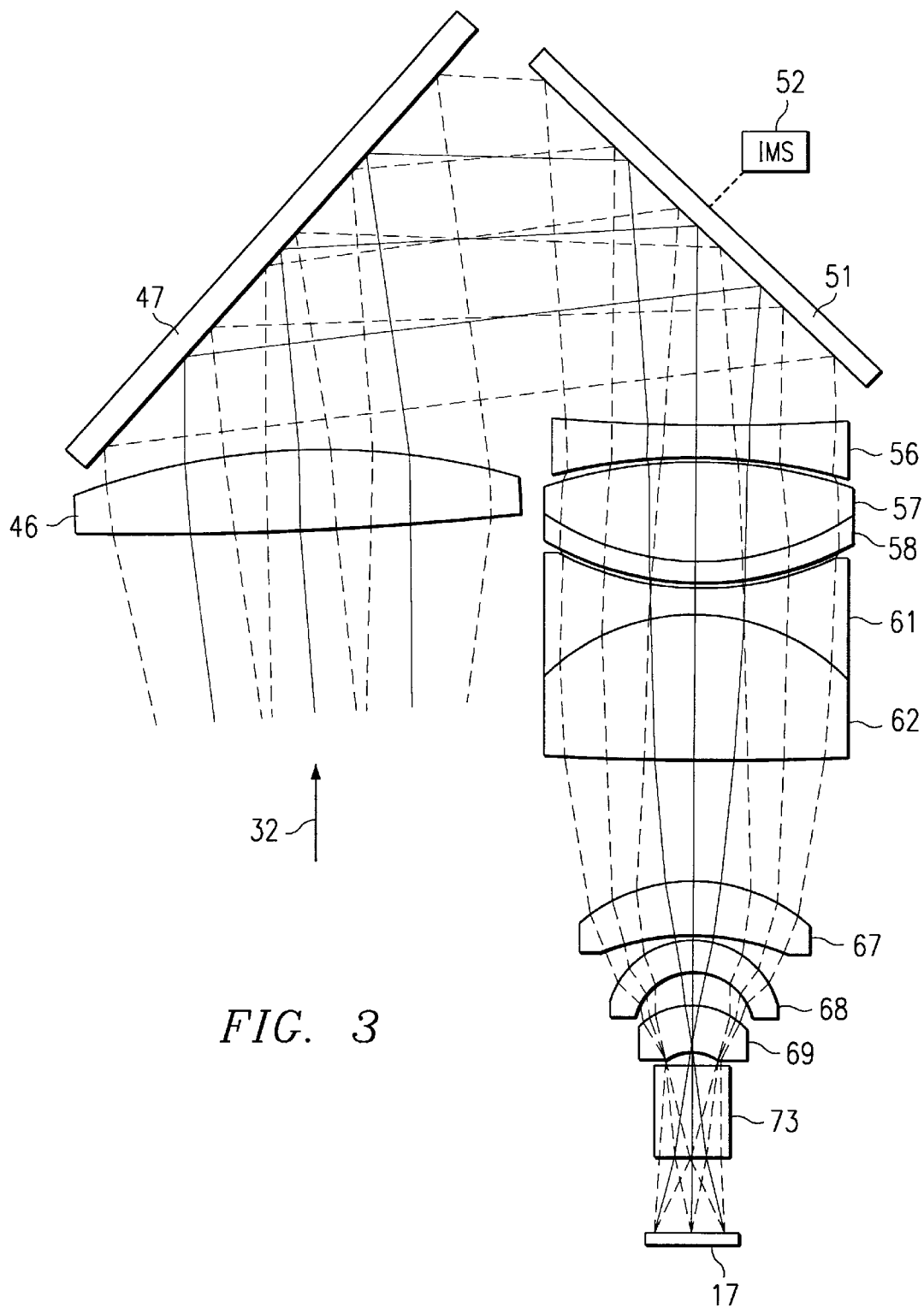
FIG. 3 is a diagrammatic sectional view of a television detector and associated optical elements, which are all components of the sensor assembly of FIG. 1.

As mentioned above, radiation other than midwave infrared radiation is reflected upwardly at 32 by the beam splitter 31. The optical path of this radiation will now be described with reference to FIGS. 1 and 3, where FIG. 3 is a diagrammatic sectional view of the optical path for radiation traveling from the beam splitter 31 to the TV detector 17 (FIG. 1). More specifically, the radiation reflected in the direction 32 by the beam splitter 31 travels upwardly through a converging lens 46, and is then reflected by a folding mirror 47. This reflected radiation is then reflected again by a moveable mirror 51, which is controlled by a further IMS mechanism 52. The function of the IMS 52 is similar to that described above for the IMS 37. The radiation reflected from the mirror 51 travels downwardly through a diverging lens 56, a converging lens 57, a converging lens 58, a diverging lens 61, and a converging lens 62. The lenses 57 and 58 have mating surfaces which are bonded to each other, for example using a known cement. Similarly, the lenses 61 and 62 have mating surfaces which are bonded to each other.

After passing through the lens 62, the radiation passes through a converging lens 67, a converging lens 68, and a converging lens 69, and then enters a beam splitter 73. With reference to FIG. 1, the beam splitter 73 reflects downwardly-traveling radiation in the near-infrared waveband, so that it travels horizontally outwardly to and forms an image on the TV detector 17. Downwardly-traveling laser light passes through the beam splitter 73 without being reflected, and then passes through a lens 77, which focuses the laser light on the laser detector 18.

The aperture 12 is used to provide the FLIR detector 16 and the TV detector 17 with a narrow field of view (NFOV). The aperture 13 is used to provide the FLIR detector 16 with a middle field of view (MFOV) and a wide field of view (WFOV). An explanation will now be provided of how radiation entering through aperture 13 and window 14 can optionally be routed to the FLIR detector 16 in order to provide a WFOV or MFOV. For this purpose, and with reference to FIG. 1, a folding mirror 81 can be removably inserted between the beam splitter 31 and the lens 33, so as to be parallel to and adjacent the beam splitter 31. When the mirror 81 is physically removed from the position shown in FIG. 1, midwave infrared radiation entering the aperture 12 is routed to the FLIR detector 16 in the manner discussed above in association with FIG. 2. On the other hand, when the mirror 81 is disposed in the position shown in FIG. 1, it interrupts the optical path between the aperture 12 and the detector 16, and instead creates an optical path from the aperture 13 to the detector 16, as discussed below in more detail with reference to FIG. 4.

Figure 4:
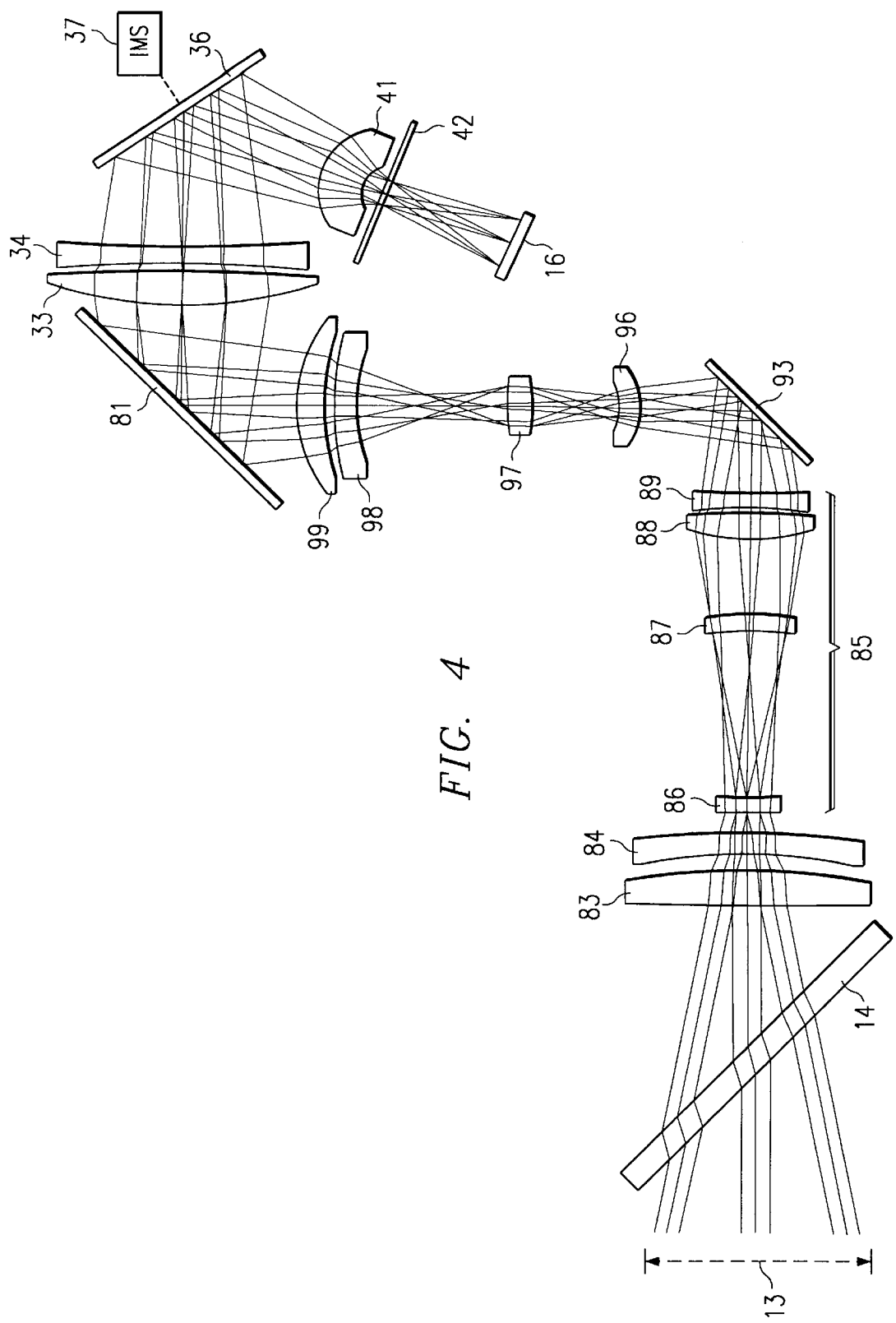
FIG. 4 is a diagrammatic sectional view of a system of optical elements which provides a wide field of view for the staring array detector, all of which are components of the sensor assembly of FIG. 1.

With reference to FIGS. 1 and 4, infrared radiation entering the system through the aperture 13 and window 14 passes through a converging lens 83, and a diverging lens 84. It then passes through a lens system 85, which includes a diverging lens 86, a converging lens 87, a converging lens 88, and a diverging lens 89. The radiation is then reflected by a folding mirror 93, and passes through a converging lens 96 and a converging lens 97. The radiation then passes through a diverging lens 98 and a converging lens 99. The radiation is then reflected by the mirror 81, which is in the position shown at FIG. 1, where it is adjacent to the beam splitter 31.

Following reflection by the mirror 81, the radiation follows an optical path which is the same as that described above in association with FIG. 2, in that the radiation successively encounters lens 33, lens 34, mirror 36, lens 41, window 42 and detector 16. FIG. 4 shows the lens configuration for the wide field of view. This lens configuration has been specifically designed so that conversion to a middle field of view requires only the removal of the lens system 85 (lenses 86–89) from the optical path between the lens 84 and the mirror 93. More specifically, the middle field of view configuration is shown in FIG. 5, and it will be noted that FIG. 5 is identical to FIG. 4 except that the lens system 85 of FIG. 4 has been removed from the optical path.

Referring to FIG. 1, and ignoring aperture 13 and the associated optical elements, it will be noted that the structure associated with aperture 12 is extremely physically compact. The three detectors 16–18, and all of the optical structure routing radiation to them, is disposed within a not-illustrated imagery cylinder which is coaxial with and has the same diameter as the primary mirror 21, and which has an axial length bounded by the secondary mirror 22 and the folding mirror 36. The physical length of this imaginary cylinder, from the secondary mirror 22 to the folding mirror 36, is less than 1.5 times the diameter of primary mirror 21. This compactness is due in part to the fact that the focusing mirrors 21 and 22 take up significantly less space than would be needed for an afocal which is totally reflective.

As discussed above, the beam splitter 31 of FIG. 1 passes midwave infrared radiation, and the FLIR detector 16 detects midwave infrared radiation. It will be recognized that the detector 16 could be replaced with a similar staring array detector responsive to longwave infrared radiation rather than midwave infrared radiation, and that the beam splitter 31 could be replaced with a similar beam splitter that passes longwave infrared radiation rather than midwave infrared radiation. In association with this change, the lens system provided for the midwave detector 16 would need to be replaced with a lens system suitable for imaging longwave infrared radiation, which in particular may be similar to a lens system which is shown in FIG. 6 and described in more detail later.

The sensor assembly 10 of FIG. 1 can alternatively be modified so as to have two separate FLIR detectors that each have a narrow field of view through the aperture 12, one of these two detectors sensing midwave infrared radiation and the other sensing longwave infrared radiation. More specifically, the detectors 17 and 18, and the optical elements disposed between these detectors and the beam splitter 31, would be replaced with the structure shown in FIG. 6. In this alternative embodiment, midwave infrared radiation is still routed to the detector 16 in the manner described above in association with FIG. 2. With reference to FIGS. 1 and 6, longwave infrared radiation is reflected upwardly by the beam splitter 31 in the direction 32, and then passes through a converging lens 111 and a diverging lens 112 to a mirror 116. The mirror 116 is supported for a small amount of movement, such movement being controlled by an IMS 117, which is comparable in function to the IMS 37 discussed above in association with FIGS. 1 and 2.

The radiation reflected by mirror 116 passes through a converging lens 121 and an infrared-transparent window 122, and is focused on a FLIR detector 123. The FLIR detector 123 is a staring array detector, which is similar to the detector 16 of FIG. 1, except that the detector 123 detects longwave infrared radiation, whereas the detector 16 detects midwave infrared radiation.

As discussed above, the sensor assembly 10 of FIG. 1 has two mirrors 36 and 51 which are controlled by respective IMS mechanisms 37 and 52. According to yet another alternative embodiment, the IMS mechanisms 37 and 52 may be both be omitted, and the mirrors 36 and 51 may be fixedly secured in position. In place of the two IMS mechanisms 37 and 52, and with reference to FIG. 2, the secondary mirror 22 would be moveably supported, and a single IMS mechanism 127 would be provided to control movement of the secondary mirror 122, so as to effect image motion stabilization for all three of the detectors 16, 17 and 18.

Figure 7:
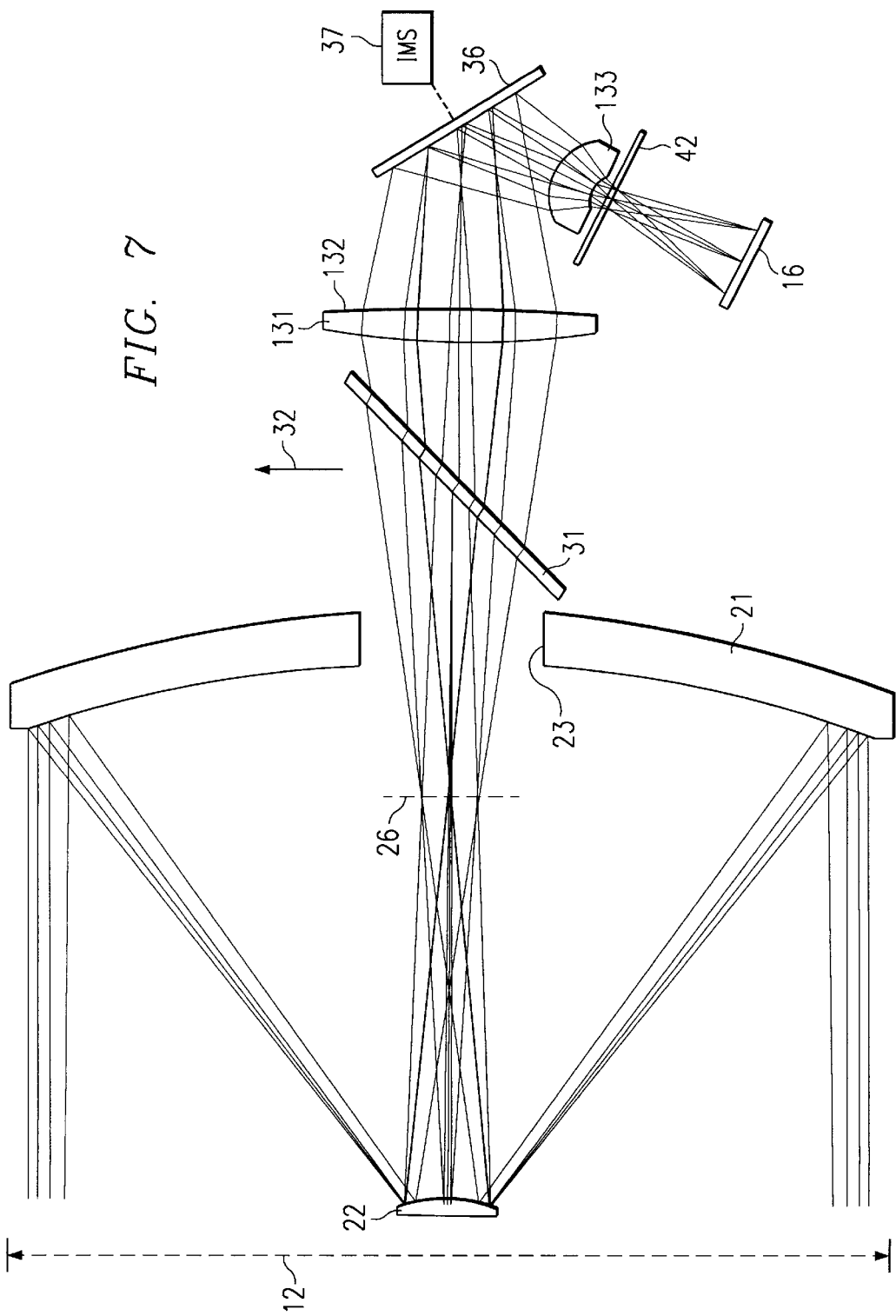
FIG. 7 is a diagrammatic sectional view similar to FIG. 2, but showing an alternative embodiment of the optical system which utilizes diffractive optics.
Figure 8:
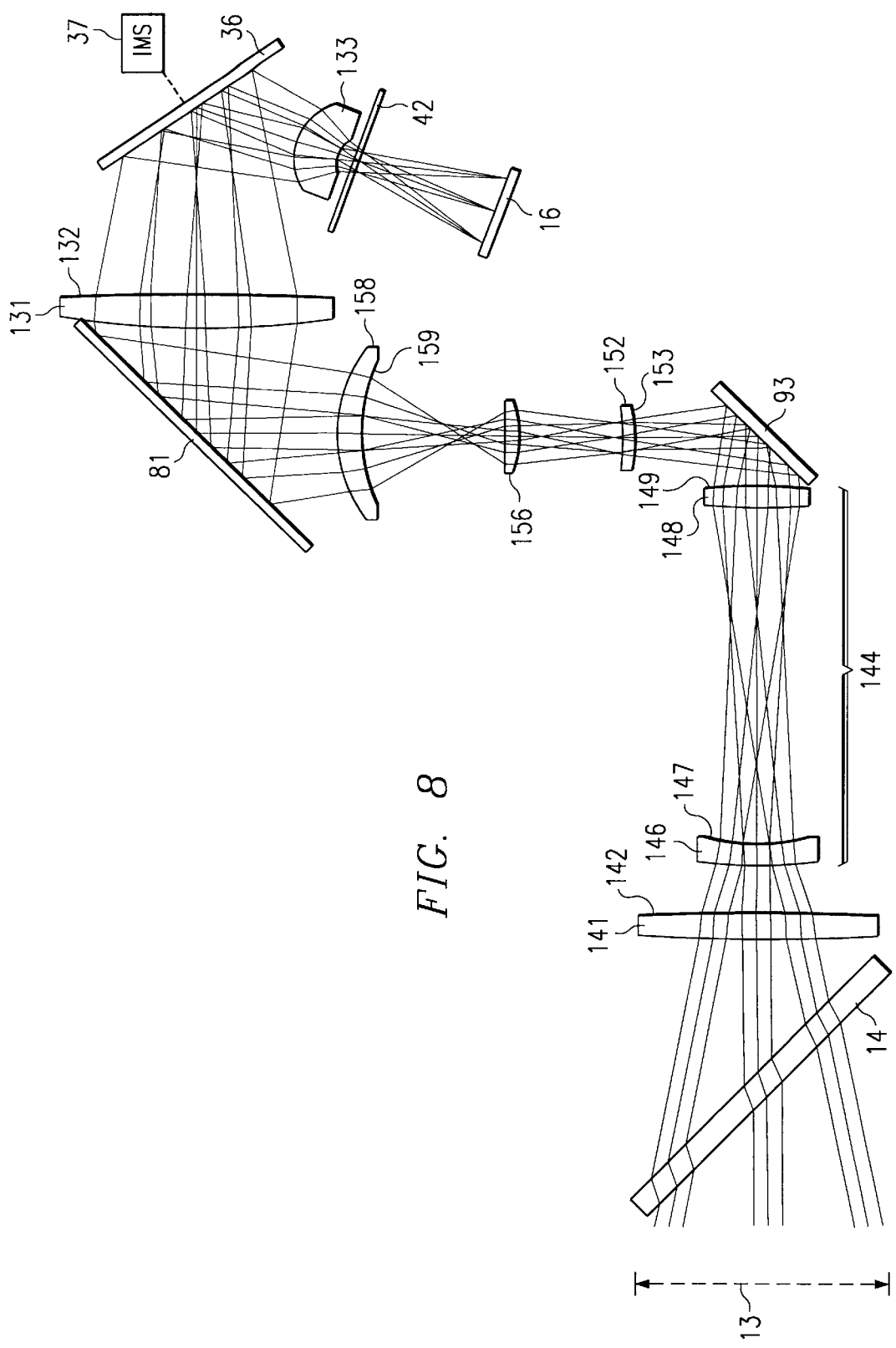
FIGS. 8 and 9 are diagrammatic sectional views respectively similar to FIGS. 4 and 5, but showing an alternative embodiment of the optical system which utilizes diffractive optics.
Figure 9:
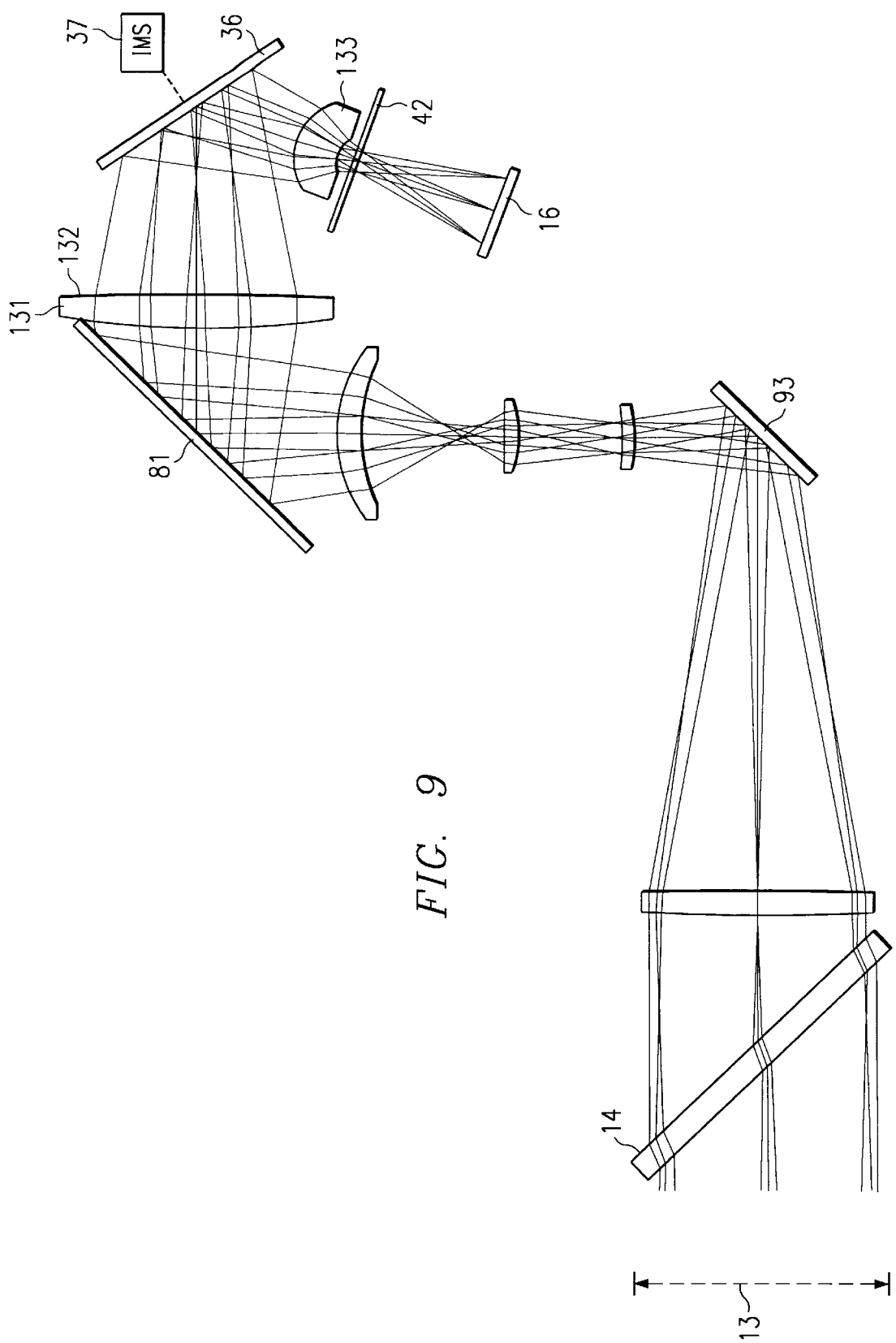

All of the lenses in the embodiment of FIG. 1 are refractive. Through the use of diffractive optics, it is possible to reduce the number of lens required. FIGS. 7–9 show an alternative embodiment, which uses diffractive optics in order to reduce the number of lens. The embodiment of FIGS. 7–9 is equivalent to the embodiment of FIG. 1, except for the differences specifically described hereinafter.

More specifically, with reference to FIG. 7, infrared radiation passing through the beam splitter 31 passes through a converging lens 131, which has a diffractive surface 132 on a side thereof opposite from the beam splitter 31. The radiation is then reflected by the mirror 36, passes through a converging lens 133 and the window 42, and forms an image on the detector 16. It will be noted that there are only two lenses 131 and 133 between the beam splitter 31 and the detector 16, whereas the embodiment of FIG. 2 has the three lens 33, 34 and 41 between the beam splitter 31 and the detector 16.

Referring to FIG. 8, radiation which enters through the aperture 13 and associated window 14 passes through a converging lens 141 having a diffractive surface 142 on a side thereof opposite from the window 14. The radiation then passes through a lens system 144, which includes a diverging lens 146 having a diffractive surface 147 on a side thereof opposite from the window 14, and which includes a converging lens 148 having a diffractive surface 149 on a side thereof opposite from the window 14. The radiation is then reflected by the folding mirror 93, and passes through a converging lens 152 having a diffractive surface 153 on the side thereof facing the mirror 93.

Thereafter, the radiation passes through a converging lens 156, and then through a further converging lens 158 which has a diffractive surface 159 on a side thereof which faces the mirror 93. After leaving the lens 158, the radiation is reflected by the mirror 81. The remainder of the optical path is the same as that just described in association with FIG. 7, including the lens 131, mirror 36, lens 133, window 42 and detector 16.

The lens system which is shown in FIG. 8 provides a wide field of view. This can be converted to a middle field of view by physically removing the lens system 144 from the optical path, in order to achieve the optical arrangement shown in FIG. 9.

TABLES 1 to 8, below, set forth prescriptions for optical surfaces disposed along the optical paths which are respectively depicted in FIGS. 2 to 9. It will be recognized that there are variations and modifications of the disclosed optical arrangements, including variations in the optical prescriptions, which lie within the spirit and scope of the present invention.

TABLE 1

OPTICAL PRESCRIPTION (FIG. 2)

| | | RDY | | THI | | GLA | | |
|---|---|---|---|---|---|---|---|---|
| 1 | | −8.88721 | | −3.950000 | | REFL | | |
| | K | −1.000000 | | | | | | |
| 2 | | −1.16584 | | 3.243684 | | REFL | | |
| | K | −1.819652 | | | | | | |
| 3 | | INFINITY | | 1.925635 | | | | |
| 4 | | INFINITY | | 0.080000 | | SILICN | | |
| | ADE | −45.000000 | BDE | 0.000000 | CDE | 0.000000 | | |
| 5 | | INFINITY | | 0.000000 | | | | |
| | XDE | 0.000000 | YDE | 0.016884 | ZDE | 0.000000 | | |
| | ADE | 0.031826 | BDE | 0.000000 | CDE | 0.000000 | | |
| 6 | | INFINITY | | 0.979992 | | | | |
| | XDE | 0.000000 | YDE | 0.000000 | ZDE | 0.000000 | | |
| | ADE | 44.849390 | BDE | 0.000000 | CDE | 0.000000 | | |
| 7 | | 3.00428 | | 0.229902 | | SILICN | | |
| 8 | | −20.17644 | | 0.066548 | | | | |
| 9 | | −9.32142 | | 0.125000 | | GERM | | |
| 10 | | 15.04614 | | 0.943093 | | | | |
| 11 | | INFINITY | | −1.050000 | | REFL | | |
| 12 | | −0.43653 | | −0.303679 | | SILICN | | |
| | A | 0.680091E01 B | | 0.133182E+01 | C | −.106800E+02 | D | 0.817163E+02 |
| 13 | | −0.22936 | | −0.142110 | | | | |
| 14 | | INFINITY | | −0.032000 | | SAPHIR | | |
| 15 | | INFINITY | | −0.030000 | | | | |
| STO | | INFINITY | | −0.895732 | | | | |
| IMG | | INFINITY | | 0.000000 | | | | |

TABLE 2

OPTICAL PRESCRIPTION (FIG. 3)

| | | RDY | | THI | | GLA | | |
|---|---|---|---|---|---|---|---|---|
| STO | | −8.88721 | | −3.950000 | | REFL | | |
| | K | −1.000000 | | | | | | |
| 4 | | −1.16584 | | 3.221544 | | REFL | | |
| | K | −1.819652 | | | | | | |
| 5 | | INFINITY | | 1.947774 | | | | |
| 6 | | INFINITY | | −0.700000 | | REFL | | |
| 7 | | −10.52917 | | −0.272591 | | LASFN31_SCHOTT | | |
| 8 | | 3.55635 | | −0.131975 | | | | |
| 9 | | INFINITY | | −0.650000 | | | | |
| 10 | | INFINITY | | 0.700000 | | REFL | | |
| 11 | | INFINITY | | 0.850000 | | | | |
| 12 | | INFINITY | | −0.750000 | | REFL | | |
| 13 | | 8.56940 | | −0.120059 | | ZNS | | |
| 14 | | −2.20159 | | −0.020000 | | | | |
| | A | −.775984E−01 B | | −.124042E−02 | C | −.124669E+00 | D | −.236223E−01 |
| 15 | | −1.76614 | | −0.377210 | | LASFN31_SCHOTT | | |
| 16 | | 1.06951 | | −0.080405 | | SLAL56_OHARA | | |
| 17 | | 1.18814 | | −0.020000 | | | | |
| 18 | | 1.18927 | | −0.099974 | | SF1_SCHOTT | | |
| 19 | | −0.78292 | | −0.540847 | | LASFN31_SCHOTT | | |
| 20 | | 15.80815 | | −0.466823 | | | | |
| 21 | | −0.65093 | | −0.203872 | | LASFN31_SCHOTT | | |
| 22 | | −0.93583 | | −0.020000 | | | | |
| 23 | | −0.32484 | | −0.120000 | | ZNS | | |
| 24 | | −0.23015 | | −0.126342 | | | | |

TABLE 2-continued

OPTICAL PRESCRIPTION (FIG. 3)

| | RDY | THI | GLA |
|---|---|---|---|
| 25 | −0.28744 | −0.174978 | LASFN31_SCHOTT |
| 26 | −0.18568 | −0.050000 | |
| 27 | INFINITY | −0.350000 | LASFN31_SCHOTT |
| 28 | INFINITY | −0.278709 | |
| IMG | INFINITY | 0.000740 | |

TABLE 3

OPTICAL PRESCRIPTION (FIG. 4)

| | | RDY | | THI | | GLA | | |
|---|---|---|---|---|---|---|---|---|
| 1 | | 41.22953 | | 0.250000 | | SILICN | | |
| 2 | | −4.73676 | | 0.123771 | | | | |
| 3 | | −3.47895 | | 0.150000 | | GERM | | |
| 4 | | −6.00630 | | 0.150000 | | | | |
| 5 | | −4.49933 | | 0.100000 | | GERM | | |
| | A | −.976266E01 | B | 0.693325E+01 | C | −.200766E+03 | D | 0.198054E+04 |
| 6 | | 2.45456 | | 0.864134 | | | | |
| 7 | | INFINITY | | 0.312387 | | | | |
| 8 | | −2.17403 | | 0.120000 | | SILICN | | |
| | A | 0.140095E+00 | B | −.362783E+00 | C | 0.487027E+01 | D | −.382764E+02 |
| 9 | | −2.12001 | | 0.519730 | | | | |
| 10 | | 1.54617 | | 0.180000 | | SILICN | | |
| 11 | | −5.16359 | | 0.038133 | | | | |
| 12 | | −2.99417 | | 0.100000 | | GERM | | |
| 13 | | 11.04500 | | 0.591050 | | | | |
| | A | 0.799886E01 | B | −.885354E01 | C | 0.501114E01 | D | 0.221278E+00 |
| 14 | | INFINITY | | −0.766401 | | REFL | | |
| 15 | | −0.47504 | | −0.150000 | | SILICN | | |
| | A | −.447986E+00 | B | 0.624460E+01 | C | −.121326E+03 | D | 0.787966E+03 |
| 16 | | −0.45938 | | −0.095879 | | | | |
| 17 | | INFINITY | | −0.506957 | | | | |
| 18 | | −1.14087 | | −0.170000 | | SILICN | | |
| 19 | | 1.69435 | | −1.049478 | | | | |
| | A | −.149896E+01 | B | 0.207350E+02 | C | −.913289E+03 | D | 0.152986E+05 |
| 20 | | 1.17647 | | −0.150000 | | GERM | | |
| 21 | | 2.20899 | | −0.070799 | | | | |
| 22 | | 1.79488 | | −0.190622 | | SILICN | | |
| 23 | | 1.02253 | | −0.799923 | | | | |
| 24 | | INFINITY | | 0.719988 | | REFL | | |
| 25 | | 3.00428 | | 0.229902 | | SILICN | | |
| 26 | | −20.17644 | | 0.066548 | | | | |
| 27 | | −9.32142 | | 0.125000 | | GERM | | |
| 28 | | 15.04614 | | 0.943093 | | | | |
| 29 | | INFINITY | | −1.050000 | | REFL | | |
| 30 | | −0.43653 | | −0.303679 | | SILICN | | |
| | A | 0.680091E01 | B | 0.133182E+01 | C | −.106800E+02 | D | 0.817163E+02 |
| 31 | | −0.22936 | | −0.142110 | | | | |
| 32 | | INFINTTY | | −0.032000 | | SAPHIR | | |
| 33 | | INFINITY | | −0.030000 | | | | |
| STO | | INFINITY | | −0.895732 | | | | |
| IMG | | INFINITY | | 0.000000 | | | | |

TABLE 4

OPTICAL PRESCRIPTION (FIG. 5)

| | RDY | THI | GLA |
|---|---|---|---|
| 1 | 41.22953 | 0.250000 | SILICN |
| 2 | −4.73676 | 0.123771 | |
| 3 | −3.47895 | 0.150000 | GERM |
| 4 | −6.00630 | 2.976229 | |

TABLE 4-continued

OPTICAL PRESCRIPTION (FIG. 5)

|   |     | RDY           |   | THI           |   | GLA          |   |              |
|---|-----|---------------|---|---------------|---|--------------|---|--------------|
| 5 |     | INFINITY      |   | −0.766401     |   | REFL         |   |              |
| 6 |     | −0.47504      |   | −0.150000     |   | SILICN       |   |              |
|   | A   | −.447986E+00  | B | 0.624460E+01  | C | −.121326E+03 | D | 0.787966E+03 |
| 7 |     | −0.45938      |   | −0.095879     |   |              |   |              |
| 8 |     | INFINITY      |   | −0.506957     |   |              |   |              |
| 9 |     | −1.14087      |   | −0.170000     |   | SILICN       |   |              |
| 10|     | 1.69435       |   | −1.049478     |   |              |   |              |
|   | A   | −.149896E+01  | B | 0.207350E+02  | C | −.913289E+03 | D | 0.152986E+05 |
| 11|     | 1.17647       |   | −0.150000     |   | GERM         |   |              |
| 12|     | 2.20899       |   | −0.070799     |   |              |   |              |
| 13|     | 1.79488       |   | −0.190622     |   | SILICN       |   |              |
| 14|     | 1.02253       |   | −0.799923     |   |              |   |              |
| 15|     | INFINITY      |   | 0.719988      |   | REFL         |   |              |
| 16|     | 3.00428       |   | 0.229902      |   | SILICN       |   |              |
| 17|     | −20.17644     |   | 0.066548      |   |              |   |              |
| 18|     | −9.32142      |   | 0.125000      |   | GERM         |   |              |
| 19|     | 15.04614      |   | 0.943093      |   |              |   |              |
| 20|     | INFINITY      |   | −1.050000     |   | REFL         |   |              |
| 21|     | −0.43653      |   | −0.303679     |   | SILICN       |   |              |
|   | A   | 0.680091E01   | B | 0.133182E+01  | C | −.106800E+02 | D | 0.817163E+02 |
| 22|     | −0.22936      |   | −0.142110     |   |              |   |              |
| 23|     | INFINITY      |   | −0.032000     |   | SAPHIR       |   |              |
| 24|     | INFINITY      |   | −0.030000     |   |              |   |              |
| STO|    | INFINITY      |   | −0.895732     |   |              |   |              |
| IMG|    | INFINITY      |   | 0.000000      |   |              |   |              |

TABLE 5

OPTICAL PRESCRIPTION (FIG. 6)

|   |     | RDY           |   | THI           |   | GLA          |   |              |
|---|-----|---------------|---|---------------|---|--------------|---|--------------|
| 1 |     | −9.70474      |   | −4.079740     |   | REFL         |   |              |
|   | A   | 0.148305E−03  | B | 0.567092E−06  | C | 0.395959E−07 | D | −.128865E−08 |
| 2 |     | −2.00059      |   | 3.394733      |   | REFL         |   |              |
|   | A   | 0.477868E−01  | B | −.981358E−02  | C | 0.154320E−01 | D | −.137317E−01 |
| 3 |     | INFINITY      |   | 2.885000      |   |              |   |              |
| 4 |     | 20.08498      |   | 0.351716      |   |              |   |              |
| 5 |     | −8.42436      |   | 0.365692      |   | GERM         |   |              |
|   | A   | 0.302448E−02  | B | −.226010E−03  | C | −.355913E−04 | D | 0.141616E−04 |
| 6 |     | 4.68457       |   | 0.300000      |   | ZNSE         |   |              |
| 7 |     | 3.57396       |   | 0.899908      |   |              |   |              |
| 8 |     | INFINITY      |   | −0.699455     |   | REFL         |   |              |
| 9 |     | −0.53876      |   | −0.300000     |   | GERM         |   |              |
|   | A   | −.500203E−02  | B | 0.235943E−01  | C | −.226562E+00 | D | 0.100713E+01 |
| 10|     | −0.33206      |   | −0.184758     |   |              |   |              |
| 11|     | INFINITY      |   | −0.032000     |   | GERM         |   |              |
| 12|     | INFINITY      |   | −0.030000     |   |              |   |              |
| STO|    | INFINITY      |   | −0.855955     |   |              |   |              |
| IMG|    | INFINITY      |   | 0.000234      |   |              |   |              |

TABLE 6

OPTICAL PRESCRIPTION (FIG. 7)

|   |     | RDY         |     | THI       |     | GLA       |
|---|-----|-------------|-----|-----------|-----|-----------|
| 1 |     | −8.73419    |     | −3.950000 |     | REFL      |
|   | K   | −1.000000   |     |           |     |           |
| 2 |     | −0.96869    |     | 3.003971  |     | REFL      |
|   | K   | −1.748867   |     |           |     |           |
| 3 |     | INFINITY    |     | 2.166618  |     |           |
| 4 |     | INFINITY    |     | 0.080000  |     | SILICN    |
|   | ADE | −45.000000  | BDE | 0.000000  | CDE | 0.000000  |

TABLE 6-continued

OPTICAL PRESCRIPTION (FIG. 7)

|     |      | RDY           |      | THI          |      | GLA           |   |              |
|-----|------|---------------|------|--------------|------|---------------|---|--------------|
| 5   |      | INFINITY      |      | 0.000000     |      |               |   |              |
|     | XDE  | 0.000000      | YDE  | 0.020970     | ZDE  | 0.000000      |   |              |
|     | ADE  | 0.027830      | BDE  | 0.000000     | CDE  | 0.000000      |   |              |
| 6   |      | INFINITY      |      | 0.980005     |      |               |   |              |
|     | XDE  | 0.000000      | YDE  | 0.000000     | ZDE  | 0.000000      |   |              |
|     | ADE  | 44.943985     | BDE  | 0.000000     | CDE  | 0.000000      |   |              |
| 7   |      | 6.52861       |      | 0.229926     |      | SILICN        |   |              |
| 8   |      | −21.32900     |      | 1.350000     |      |               |   |              |
|     | HOE: |               |      |              |      |               |   |              |
|     | HV1: | REA           | HV2: | REA          | HOR: | −1            |   |              |
|     | HX1: | 0.000000E+00  | HY1: | 0.000000E+00 | HZ1: | 0.100000E+19  |   |              |
|     | HX2: | 0.000000E+00  | HY2: | 0.000000E+00 | HZ2: | 0.100000E+19  |   |              |
|     | HWL: | 3500.00       | HTO: | ASP          | HCT: | R             |   |              |
|     | HCO  |               |      |              |      |               |   |              |
|     | C1:  | 1.5368E−03    | C67: | 2.2154E−03   | C68: | −3.0826E−04   |   |              |
|     | C69: | 4.7999E−04    | C70: | −2.0585E−04  |      |               |   |              |
| 9   |      | INFINITY      |      | −0.749455    |      | REFL          |   |              |
| 10  |      | −0.41708      |      | −0.295184    |      | SILICN        |   |              |
|     | A    | 0.421957E−01  | B    | 0.819910E+00 | C    | −.686491E+01  | D | 0.605438E+02 |
| 11  |      | −0.20278      |      | −0.122472    |      |               |   |              |
| 13  |      | INFINITY      |      | −0.032000    |      | SAPHIR        |   |              |
| 14  |      | INFINITY      |      | −0.030000    |      |               |   |              |
| STO |      | INFINITY      |      | −1.000000    |      |               |   |              |
| IMG |      | INFINITY      |      | 0.000000     |      |               |   |              |

TABLE 7

OPTICAL PRESCRIPTION (FIG. 8)

|   |      | RDY           |      | THI          |      | GLA          |
|---|------|---------------|------|--------------|------|--------------|
| 1 |      | 14.87561      |      | 0.180000     |      | SILICN       |
| 2 |      | −37.87158     |      | 0.349941     |      |              |
|   | HOE: |               |      |              |      |              |
|   | HV1: | REA           | HV2: | REA          | HOR: | −1           |
|   | HX1: | 0.000000E+00  | HY1: | 0.000000E+00 | HZ1: | 0.100000E+19 |
|   | HX2: | 0.000000E+00  | HY2: | 0.000000E+00 | HZ2: | 0.100000E+19 |
|   | HWL: | 3500.00       | HTO: | ASP          | HCT: | R            |
|   | HCO  |               |      |              |      |              |
|   | C1:  | 1.0912E−03    | C67: | 7.4476E−04   | C68: | 1.2570E−04   |
|   | C69: | −3.0273E−04   | C70: | 2.1942E−04   |      |              |
| 3 |      | 3.44265       |      | 0.150000     |      | SILICN       |
| 4 |      | 1.39773       |      | 2.340032     |      |              |
|   | HOE: |               |      |              |      |              |
|   | HV1: | REA           | HV2: | REA          | HOR: | −1           |
|   | HX1: | 0.000000E+00  | HY1: | 0.000000E+00 | HZ1: | 0.100000E+19 |
|   | HX2: | 0.000000E+00  | HY2: | 0.000000E+00 | HZ2: | 0.100000E+19 |
|   | HWL: | 3500.00       | HTO: | ASP          | HCT: | R            |
|   | HCO  |               |      |              |      |              |
|   | C1:  | 2.0297E−03    | C67: | −3.7770E−03  | C68: | −1.0127E−02  |
|   | C69: | 4.4296E−01    | C70: | −1.9658E+00  |      |              |
| 5 |      | 4.64861       |      | 0.150000     |      | SILICN       |
| 6 |      | −5.09494      |      | 0.371998     |      |              |
|   | HOE: |               |      |              |      |              |
|   | HV1: | REA           | HV2: | REA          | HOR: | −1           |
|   | HX1: | 0.000000E+00  | HY1: | 0.000000E+00 | HZ1: | 0.100000E+19 |
|   | HX2: | 0.000000E+00  | HY2: | 0.000000E+00 | HZ2: | 0.100000E+19 |
|   | HWL: | 3500.00       | HTO: | ASP          | HCT: | R            |
|   | HCO  |               |      |              |      |              |
|   | C1:  | 7.0778E−03    | C67: | 3.8250E−02   | C68: | 7.1455E−03   |
|   | C69: | −2.4665E−01   | C70: | 1.0457E+00   |      |              |
| 7 |      | INFINITY      |      | −0.850000    |      | REFL         |
| 8 |      | −1.44947      |      | −0.080000    |      | SILICN       |
|   | HOE: |               |      |              |      |              |
|   | HV1: | REA           | HV2: | REA          | HOR: | 1            |
|   | HX1: | 0.000000E+00  | HY1: | 0.000000E+00 | HZ1: | −.100000E+19 |
|   | HX2: | 0.000000E+00  | HY2: | 0.000000E+00 | HZ2: | −.100000E+19 |
|   | HWL: | 3500.00       | HTO: | ASP          | HCT: | R            |
|   | HCO  |               |      |              |      |              |
|   | C1:  | 1.1918E−02    | C67: | −4.7186E+00  | C68: | 1.0213E+02   |
|   | C69: | −9.5443E+02   | C70: | 1.9665E+03   |      |              |
| 9 |      | −1.51046      |      | −0.082989    |      |              |

TABLE 7-continued

OPTICAL PRESCRIPTION (FIG. 8)

|  |  | RDY |  | THI |  | GLA |  |  |
|---|---|---|---|---|---|---|---|---|
| 10 |  | INFINITY |  | −0.645891 |  |  |  |  |
| 11 |  | −0.76374 |  | −0.100000 |  | SILICN |  |  |
| 12 |  | 6.87896 |  | −1.006413 |  |  |  |  |
|  | A: | −.138886E+01 | B: | 0.598669E+01 | C: | −.246475E+02 | D: | 0.364635E+02 |
| 13 |  | 1.33202 |  | −0.170000 |  | SILICN |  |  |
|  | HOE: |  |  |  |  |  |  |  |
|  | HV1: | REA | HV2: | REA | HOR: | 1 |  |  |
|  | HX1: | 0.000000E+00 | HY1: | 0.000000E+00 | HZ1: | −.100000E+19 |  |  |
|  | HX2: | 0.000000E+00 | HY2: | 0.000000E+00 | HZ2: | −.100000E+19 |  |  |
|  | HWL: | 3500.00 | HTO: | ASP | HCT: | R |  |  |
|  | HCO |  |  |  |  |  |  |  |
|  | C1: | −1.6467E−02 | C67: | 5.6615E−02 | C68: | −7.0949E−02 |  |  |
|  | C69: | 1.7753E−01 | C70: | −2.0174E−01 |  |  |  |  |
| 14 |  | 0.98157 |  | −0.980151 |  |  |  |  |
| 15 |  | INFINITY |  | 0.750000 |  | REFL |  |  |
|  | ADE: | 44.948000 | BDE: | 0.000000 | CDE: | 0.000000 |  |  |
| 16 |  | 6.52861 |  | 0.229926 |  | SILICN |  |  |
| 17 |  | −21.32900 |  | 1.350000 |  |  |  |  |
|  | HOE: |  |  |  |  |  |  |  |
|  | HV1: | REA | HV2: | REA | HOR: | 1 |  |  |
|  | HX1: | 0.000000E+00 | HY1: | 0.000000E+00 | HZ1: | 0.100000E+19 |  |  |
|  | HX2: | 0.000000E+00 | HY2: | 0.000000E+00 | HZ2: | 0.100000E+19 |  |  |
|  | HWL: | 3500.00 | HTO: | ASP | HCT: | R |  |  |
|  | HCO |  |  |  |  |  |  |  |
|  | C1: | 1.5368E−03 | C67: | 2.2154E−03 | C68: | −3.0826E−04 |  |  |
|  | C69: | 4.7999E−04 | C70: | −2.0585E−04 |  |  |  |  |
| 18 |  | INFINITY |  | −0.749455 |  | REFL |  |  |
| 19 |  | −0.41708 |  | −0.295184 |  | SILICN |  |  |
|  | A: | 0.421957E−01 | B: | 0.819910E+00 | C: | −.686491E+01 | D: | 0.605438E+02 |
| 20 |  | −0.20278 |  | −0.122472 |  |  |  |  |
| 21 |  | INFINITY |  | −0.032000 |  | SAPHIR |  |  |
| 22 |  | INFINITY |  | −0.030000 |  |  |  |  |
| STO: |  | INFINITY |  | −1.000000 |  |  |  |  |
| IMG: |  | INFINITY |  | 0.000000 |  |  |  |  |

TABLE 8

OPTICAL PRESCRIPTION (FIG. 9)

|  |  | RDY |  | THI |  | GLA |  |  |
|---|---|---|---|---|---|---|---|---|
| 1 |  | 14.87561 |  | 0.180000 |  | SILICN |  |  |
| 2 |  | −37.87158 |  | 3.361971 |  |  |  |  |
|  | HOE: |  |  |  |  |  |  |  |
|  | HV1: | REA | HV2: | REA | HOR: | −1 |  |  |
|  | HX1: | 0.000000E+00 | HY1: | 0.000000E+00 | HZ1: | 0.100000E+19 |  |  |
|  | HX2: | 0.000000E+00 | HY2: | 0.000000E+00 | HZ2: | 0.100000E+19 |  |  |
|  | HWL: | 3500.00 | HTO: | ASP | HCT: | R |  |  |
|  | HCO |  |  |  |  |  |  |  |
|  | C1: | 1.0912E−03 | C67: | 7.4476E−04 | C68: | 1.2570E−04 |  |  |
|  | C69: | −3.0273E−04 | C70: | 2.1942E−04 |  |  |  |  |
| 3 |  | INFINITY |  | −0.850000 |  | REFL |  |  |
| 4 |  | −1.44947 |  | −0.080000 |  | SILICN |  |  |
|  | HOE: |  |  |  |  |  |  |  |
|  | HV1: | REA | HV2: | REA | HOR: | 1 |  |  |
|  | HX1: | 0.000000E+00 | HY1: | 0.000000E+00 | HZ1: | −.100000E+19 |  |  |
|  | HX2: | 0.000000E+00 | HY2: | 0.000000E+00 | HZ2: | −.100000E+19 |  |  |
|  | HWL: | 3500.00 | HTO: | ASP | HCT: | R |  |  |
|  | HCO |  |  |  |  |  |  |  |
|  | C1: | 1.1918E−02 | C67: | −4.7186E+00 | C68: | 1.0213E+02 |  |  |
|  | C69: | −9.5443E+02 | C70: | 1.9665E+03 |  |  |  |  |
| 5 |  | −1.51046 |  | −0.082989 |  |  |  |  |
| 6 |  | INFINITY |  | −0.645891 |  |  |  |  |
| 7 |  | −0.76374 |  | −0.100000 |  | SILICN |  |  |
| 8 |  | 6.87896 |  | −1.006413 |  |  |  |  |
|  | A: | −.138886E+01 | B: | 0.598669E+01 | C: | −.246475E+02 | D: | 0.364635E+02 |
| 9 |  | 1.33202 |  | −0.170000 |  | SILICN |  |  |
|  | HOE: |  |  |  |  |  |  |  |
|  | HV1: | REA | HV2: | REA | HOR: | 1 |  |  |
|  | HX1: | 0.000000E+00 | HY1: | 0.000000E+00 | HZ1: | −.100000E+19 |  |  |
|  | HX2: | 0.000000E+00 | HY2: | 0.000000E+00 | HZ2: | −.100000E+19 |  |  |
|  | HWL: | 3500.00 | HTO: | ASP | HCT: | R |  |  |

TABLE 8-continued

OPTICAL PRESCRIPTION (FIG. 9)

|  |  | RDY |  | THI |  | GLA |  |  |
|---|---|---|---|---|---|---|---|---|
|  | HCO |  |  |  |  |  |  |  |
|  | C1: | −1.6467E−02 | C67: | 5.6615E−02 | C68: | −7.0949E−02 |  |  |
|  | C69: | 1.7753E−01 | C70: | −2.0174E−01 |  |  |  |  |
| 10 |  | 0.98157 |  | −0.980151 |  |  |  |  |
| 11 |  | INFINITY |  | 0.750000 |  | REFL |  |  |
|  | ADE: | 44.948000 | BDE: | 0.000000 | CDE: | 0.000000 |  |  |
| 12 |  | 6.52861 |  | 0.229926 |  | SILICN |  |  |
| 13 |  | −21.32900 |  | 1.350000 |  |  |  |  |
|  | HOE: |  |  |  |  |  |  |  |
|  | HV1: | REA | HV2: | REA | HOR: | 1 |  |  |
|  | HX1: | 0.000000E+00 | HY1: | 0.000000E+00 | HZ1: | 0.100000E+19 |  |  |
|  | HX2: | 0.000000E+00 | HY2: | 0.000000E+00 | HZ2: | 0.100000E+19 |  |  |
|  | HWL: | 3500.00 | HTO: | ASP | HCT: | R |  |  |
|  | HCO |  |  |  |  |  |  |  |
|  | C1: | 1.5368E−03 | C67: | 2.2154E−03 | C68: | −3.0826E−04 |  |  |
|  | C69: | 4.7999E−04 | C70: | −2.0585E−04 |  |  |  |  |
| 14 |  | INFINITY |  | −0.749455 |  | REFL |  |  |
| 15 |  | −0.41708 |  | −0.295184 |  | SILICN |  |  |
|  | A: | 0.421957E−01 | B: | 0.819910E+00 | C: | −.686491E+01 | D: | 0.605436E+02 |
| 16 |  | −0.20278 |  | −0.122472 |  |  |  |  |
| 17 |  | INFINITY |  | −0.032000 |  | SAPHIR |  |  |
| 18 |  | INFINITY |  | −0.030000 |  |  |  |  |
| STO: |  | INFINITY |  | −1.000000 |  |  |  |  |
| IMG: |  | INFINITY |  | 0.000000 |  |  |  |  |

The present invention provides a number of technical advantages. One such technical advantage is the realization of a sensor assembly which has a plurality of detectors and also image motion stabilization, but which is physically compact and has a relatively low weight. A further advantage is that several detectors all use a common, relatively large aperture for a narrow field of view. Yet another advantage is that there are relatively short optical paths with a minimum number of optical elements, which has the effect of minimizing optical losses. By reducing the overall size of the sensor assembly, there is a reduction in the drag which is created when the sensor assembly is disposed in the air stream of an airborne vehicle.

By reducing the size and weight of the sensor assembly, the size and weight of the gimbal required to support the sensor assembly is also reduced, which further reduces the drag factor they create in an air stream. A further technical advantage is that diffractive optics can optionally be used to further reduce the number of optical elements in the assembly.

Although selected embodiments have been illustrated and described in detail, it will be recognized that various changes, substitutions and alternations, including the rearrangement and reversal of parts, can be made without departing from the spirit and scope of the invention, as defined by the following claims.

What is claimed is:

1. An apparatus, comprising:
a focusing mirror arrangement which is operative to receive radiation traveling along a first optical path, and to focus the received radiation to travel along a second optical path;
a part defining an aperture, wherein the first optical path extends through said aperture;
a beam splitter disposed along the second optical path and operative to cause a first portion of the radiation which has a first wavelength to be directed along a third optical path and to cause a second portion of the radiation which has a second wavelength different from the first wavelength to be directed along a fourth optical path different from the third optical path;
a first detector disposed along the third optical path and operative to detect radiation at the first wavelength;
a second detector disposed along the fourth optical path and operative to detect radiation at the second wavelength;
a first lens arrangement disposed along the third optical path between said beam splitter and said first detector; and
a second lens arrangement disposed along the fourth optical path between said beam splitter and said second detectors;
wherein a region is bounded by a length dimension less than 1.5 times a transverse dimension of said aperture and by transverse dimensions less than the transverse dimension of said aperture, the region having therein said focusing mirror arrangement, said beam splitter, said first and second detectors, and said first and second lens arrangements.

2. An apparatus according to claim 1, wherein said focusing mirror arrangement includes facing first and second mirrors, said first mirror focusing the radiation traveling along the first optical path onto said second mirror, and said second mirror focusing the radiation from said first mirror to travel along the second optical path, said first and second optical paths being colinear, said first mirror having an opening therethrough, and said second optical path extending through said opening in said first mirror.

3. An apparatus according to claim 2, wherein said first mirror is a concave parabolic mirror and said second mirror is a convex conic mirror.

4. An apparatus according to claim 2, wherein said second mirror is moveably supported, and including a mechanism which is operative to control movement of said second mirror so as to effect image motion stabilization.

5. An apparatus according to claim 2, wherein said part is a housing which encloses said region.

6. An apparatus according to claim 1, including first and second reflecting mirrors which are respectively provided along said third and fourth optical paths and which are each movably supported, and including first and second mechanisms each operative to control movement of a respective one of said first and second reflecting mirrors so as to effect image motion stabilization.

7. An apparatus according to claim 1, wherein the radiation traveling along the first optical path is collimated radiation; and wherein said beam splitter is located in converging radiation.

8. An apparatus according to claim 7, wherein said focusing mirror arrangement produces an image at a location along the second optical path prior to said beam splitter.

9. An apparatus according to claim 1, wherein said first and second lens arrangements each have only refractive lenses therein.

10. An apparatus according to claim 1, wherein said first lens arrangement includes a diffractive element.

11. An apparatus according to claim 1, wherein said first detector includes a two-dimensional infrared staring array.

12. An apparatus according to claim 1, wherein said first and second detectors each detect radiation in a respective different one of a range of 0.7 to 0.9 micron wavelengths, a range of approximately 1.06 to 1.54 micron wavelengths, a range of approximately 3 to 5 micron wavelengths, and a range of approximately 8 to 10 micron wavelengths.

13. An apparatus according to claim 1, wherein said first detector senses infrared radiation, and wherein said first lens arrangement includes only three lenses between said beam splitter and said first detector.

14. An apparatus according to claim 1, wherein said first detector senses infrared radiation, and wherein said first lens arrangement includes only two lenses between said beam splitter and said first detector.

15. An apparatus according to claim 1, including a mirror movable between first and second positions in which said mirror is respectively disposed in and spaced from the third optical path, wherein when said mirror is in said first position said mirror is operative to redirect radiation traveling along a fifth optical path to travel along the third optical path toward said first detector, the fifth optical path being different from the first and second optical paths; and including a third lens arrangement disposed along said fifth optical path.

16. An apparatus according to claim 15, including a part which defines a further aperture, wherein the fifth optical path extends through said further aperture.

17. An apparatus according to claim 16, wherein a portion of said third lens arrangement is movable between first and second positions in which said portion of said third lens arrangement is respectively disposed in and spaced from the fifth optical path, and wherein when said portion of said third lens arrangement is in said first position said third lens arrangement is operative to provide a wide field of view, and when said portion of said third lens arrangement is in said second position said third lens arrangement is operable to provide a middle field of view.

18. An apparatus according to claim 1, wherein the first and second optical paths are free of refractive and diffractive optical elements.

19. An apparatus comprising:
a focusing mirror arrangement which is operative to receive radiation traveling along a first optical path and to focus the received radiation to travel along a second optical path;
a part defining an aperture, wherein the first optical path extends through said aperture;
a first beam splitter disposed along the second optical path and operative to cause a first portion of the radiation to be directed along a third optical path and a second portion of the radiation to be directed along a fourth optical path different from the third optical path;
a first detector disposed along the third optical path and operative to detect radiation at a first wavelength;
a first lens arrangement disposed along the third optical path between said first beam splitter and said first detector;
a second beam splitter disposed along the fourth optical path and operative to cause respective portions of the radiation traveling along the fourth optical path to be respectively directed along fifth and sixth optical paths which are different;
a second detector disposed along the fifth optical path and operative to detect radiation at a second wavelength different from the first wavelength;
a third detector disposed along the sixth optical path and operative to detect radiation at a third wavelength different from each of the first and second wavelengths;
a second lens arrangement disposed along the fourth optical path; and
a third lens arrangement disposed along the fifth optical path;
wherein a region is bounded by a length dimension less than 1.5 times a transverse dimension of said aperture and by transverse dimensions less than the transverse dimension of said aperture, the region having therein said focusing mirror arrangement, said first and second beam splitters, said first, second and third detectors, and said first, second and third lens arrangements.

20. An apparatus according to claim 15, wherein said focusing mirror arrangement includes first and second focusing mirrors which face each other, said first and second optical paths being colinear, said first mirror having an opening therethrough, said first mirror focusing onto the second mirror the radiation traveling along the first optical path, and said second mirror focusing radiation from said first mirror along the second optical path, the second optical path extending through said opening in said first mirror.

21. An apparatus according to claim 20, wherein said second focusing mirror is moveably supported, and including a mechanism which is operative to control movement of said second mirror so as to effect image motion stabilization.

22. An apparatus according to claim 20, wherein said part is a housing which encloses said region.

23. An apparatus according to claim 19, wherein the first and second optical paths are free of refractive and diffractive optical elements.

24. An apparatus according to claim 19, including first and second reflecting mirrors which are respectively provided along the third and fourth optical paths and which are each movably supported, and including first and second mechanisms which are each operative to control movement of a respective one of said first and second reflecting mirrors so as to effect image motion stabilization.

25. An apparatus according to claim 19, wherein the radiation traveling along the first optical path is collimated radiation; and wherein said first beam splitter is located in converging radiation.

26. An apparatus according to claim 25, wherein said focusing, mirror arrangement produces an image at a location along the second optical path prior to said first beam splitter.

27. An apparatus according to claim 19, wherein said first detector includes a two-dimensional infrared staring array.

28. An apparatus according to claim 19, including a mirror movable between first and second positions in which said mirror is respectively disposed in and spaced from the third optical path, wherein when said mirror is in said first position said mirror is operative to redirect radiation traveling along a seventh optical path to travel along the third optical path toward said first detector, the seventh optical path being different from the first and second optical paths; and including a fourth lens arrangement disposed along the seventh optical path.

29. An apparatus according to claim 28, including a part which defines a further aperture, wherein the seventh optical path extends through said further aperture, said fourth lens arrangement being disposed along the seventh optical path between said further aperture and said mirror.

30. An apparatus according to claim 29, wherein a portion of said fourth lens arrangement is movable between first and second positions in which said portion of said fourth lens arrangement is respectively disposed in and spaced from the seventh optical path, and wherein when said portion of said fourth lens arrangement is in said first position said fourth lens arrangement is operative to provide a wide field of view, and when said portion of said fourth lens arrangement is in said second position said fourth lens arrangement is operable to provide a middle field of view.

31. An apparatus comprising:
  a part defining an aperture, wherein a first optical path extends through said aperture and wherein the first optical path is free of refractive and diffractive optical elements;
  a focusing mirror arrangement which is operative to receive radiation traveling alone a first portion of the first optical path prior to said focusing mirror arrangement, and to focus the received radiation to travel along a second portion of the first optical path subsequent to said focusing mirror arrangement;
  a beam splitter responsive to radiation traveling along the second portion of the first optical path and operative to cause a first portion of the radiation which has a first wavelength to be directed along a second optical path and to cause a second portion of the radiation which has a second wavelength different from the first wavelength to be directed along a third optical path different from the second optical path;
  a first detector disposed along the second optical path and operative to detect radiation at the first wavelength;
  a second detector disposed along the third optical path and operative to detect radiation at the second wavelength;
  a first lens arrangement disposed along the second optical path between said beam splitter and said first detector; and
  a second lens arrangement disposed along the third optical path between said beam splitter and said second detector;
  wherein a region is bounded by a length dimension less than 1.5 times a transverse dimension of said aperture and by transverse dimensions less than the transverse dimension of said aperture, the region having therein said apertures, said focusing mirror arrangement, said beam splitter, said first and second detectors, and said first and second lens arrangements.

32. An apparatus according to claim 31, further including:
  a further beam splitter disposed along the third optical path between said second detector and said second lens arrangement and operative to cause the second portion of the radiation having the second wavelength to continue traveling along the third optical path and to cause a third portion of the radiation having a third wavelength different from each of the first and second wavelengths to be directed along a fourth optical path which is different from the third optical path;
  a third detector disposed along the fourth optical path and operative to detect radiation at the third wavelength; and
  a third lens arrangement disposed along the fourth optical path.

33. An apparatus according to claim 32, wherein the radiation traveling along the first portion of the first optical path is collimated radiation; and wherein the region has therein said further beam splitter, said third detector, and said third lens arrangement.

* * * * *

UNITED STATES PATENT AND TRADEMARK OFFICE
CERTIFICATE OF CORRECTION

PATENT NO. : 6,174,061 B1
DATED : January 16, 2001
INVENTOR(S) : Erwin E. Cooper It is certified that error appears in the above-identified patent and that said Letters Patent is hereby corrected as shown below:

Column 11,
Line 4 (Table 5), after "0.351716", insert -- GERM --.
Line 5 (Table 5), after "0.365692", delete "GERM".

Column 13,
Line HVI (Table 6), after "REA", delete "HY2:", and insert -- HV2: --.

Column 17,
In the second line of entry 15 in Table 8: after "D:", delete "0.605436E+02", and insert -- 0.605438E+02 --.

Column 18,
Line 40, after "second", delete "detectors", and insert -- detector --.

Column 20,
Line 31, after "claim", delete "15", and insert -- 19 --.

Column 21,
Line 30, after "traveling", delete "alone", and insert -- along --.

Column 22,
Line 17, after "said", delete "apertures", and insert -- aperture --.

Signed and Sealed this

Sixteenth Day of October, 2001

*Attest:*

NICHOLAS P. GODICI
*Attesting Officer*     *Acting Director of the United States Patent and Trademark Office*